United States Patent
Yang et al.

(10) Patent No.: US 10,317,689 B2
(45) Date of Patent: Jun. 11, 2019

(54) 3D DISPLAY DEVICE AND DRIVING METHOD THEREOF

(71) Applicants: BOE Technology Group Co., Ltd., Beijing (CN); Beijing BOE Optoelectronics Technology Co., Ltd., Beijing (CN)

(72) Inventors: Ming Yang, Beijing (CN); Xiaochuan Chen, Beijing (CN); Wenqing Zhao, Beijing (CN); Pengcheng Lu, Beijing (CN); Qian Wang, Beijing (CN); Jian Gao, Beijing (CN); Xiaochen Niu, Beijing (CN); Rui Xu, Beijing (CN); Lei Wang, Beijing (CN); Yingming Liu, Beijing (CN); Shengji Yang, Beijing (CN); Haisheng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 32 days.

(21) Appl. No.: 15/505,719

(22) PCT Filed: Jul. 21, 2016

(86) PCT No.: PCT/CN2016/090830
§ 371 (c)(1),
(2) Date: Feb. 22, 2017

(87) PCT Pub. No.: WO2017/117972
PCT Pub. Date: Jul. 13, 2017

(65) Prior Publication Data
US 2018/0217391 A1    Aug. 2, 2018

(30) Foreign Application Priority Data

Jan. 5, 2016 (CN) .......................... 2016 1 0007051

(51) Int. Cl.
*H04N 5/265* (2006.01)
*G02B 27/22* (2018.01)

(52) U.S. Cl.
CPC ....... *G02B 27/2214* (2013.01); *G02B 27/225* (2013.01)

(58) Field of Classification Search
USPC ............................................ 345/419; 348/51
See application file for complete search history.

(56) References Cited

U.S. PATENT DOCUMENTS 7,345,661 B2 * 3/2008 Miyagawa ......... G02B 27/2214 345/82
9,092,871 B2 * 7/2015 Park ..................... G06T 7/0085
(Continued)

FOREIGN PATENT DOCUMENTS

CN  101571631 A  11/2009
CN  102608809 A  7/2012
(Continued)

OTHER PUBLICATIONS

Mar. 27, 2017—(CN) First Office Action Appn 201610007051.6 with English Tran.
(Continued)

*Primary Examiner* — Kimbinh T Nguyen
(74) *Attorney, Agent, or Firm* — Banner & Witcoff, Ltd.

(57) ABSTRACT

A 3D display device and a driving method thereof are provided, which includes controlling first subpixels, arranged in an electroluminescent display (ELD) panel disposed below a liquid crystal display (LCD) panel, to form luminous areas and black areas alternately arranged in the row direction, so as to form a rear grating; determining a position for displaying a left-eye view and a position for displaying a right-eye view in the LCD panel according to current positions of eyes of a viewer; and controlling second
(Continued)

subpixels corresponding to the same position for displaying the left-eye image in the LCD panel to display same view, and controlling second subpixels corresponding to the same position for displaying the right-eye image to display same view.

14 Claims, 4 Drawing Sheets

(56) References Cited

U.S. PATENT DOCUMENTS

| | | | | |
|---|---|---|---|---|
| 2012/0229431 | A1* | 9/2012 | Hiroki | G09F 19/14 345/204 |
| 2013/0249976 | A1* | 9/2013 | Kunieda | G09G 3/003 345/698 |
| 2014/0320614 | A1 | 10/2014 | Gaudreau | |
| 2014/0340746 | A1* | 11/2014 | Watanabe | G09G 3/003 359/464 |
| 2015/0237334 | A1* | 8/2015 | Murao | H04N 13/0404 348/59 |
| 2016/0198149 | A1* | 7/2016 | Yuuki | H04N 13/0409 348/56 |

FOREIGN PATENT DOCUMENTS

| | | |
|---|---|---|
| CN | 102868894 A | 1/2013 |
| CN | 104536578 A | 4/2015 |
| CN | 104570371 A | 4/2015 |
| CN | 104597610 A | 5/2015 |
| CN | 105093547 A | 11/2015 |
| CN | 105093553 A | 11/2015 |
| WO | 2012093849 A2 | 7/2012 |
| WO | 2012131887 A1 | 10/2012 |

OTHER PUBLICATIONS

Aug. 14, 2017—(CN) Office Action application CN 201610007051.6 with English Translation.
Jan. 3, 2018—(CN) Third Office Action Appn 201610007051.6 with English Tran.

* cited by examiner

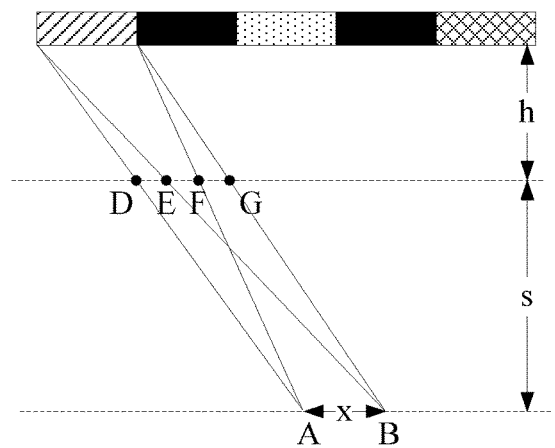
FIG. 5
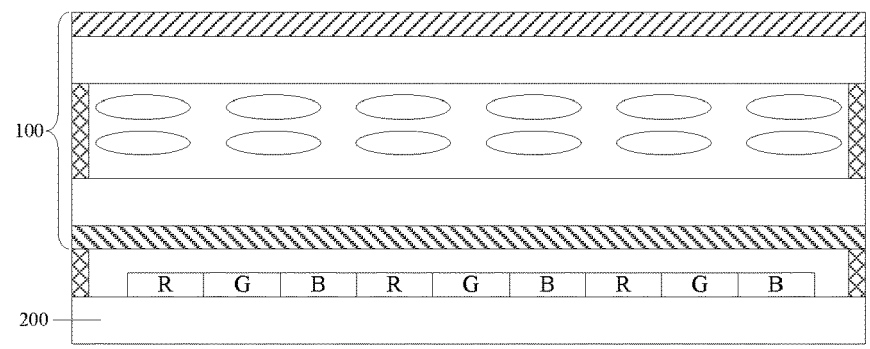
FIG. 6
FIG. 7

3D DISPLAY DEVICE AND DRIVING METHOD THEREOF

The application is a U.S. National Phase Entry of International Application No. PCT/CN2016/090830 filed on Jul. 21, 2016, designating the United States of America and claiming priority to Chinese Patent Application No. 201610007051.6 filed Jan. 5, 2016. The present application claims priority to and the benefit of the above-identified applications and the above-identified applications are incorporated by reference herein in their entirety.

TECHNICAL FIELD

Embodiments of the present disclosure relate to a 3D display device and a driving method thereof.

BACKGROUND

The main principle of 3D display technology is that the left eye and the right eye of a viewer respectively receive images with slight difference, namely a left view and a right view, and the two images are integrated via the analysis of the brain, so that the viewer can sense the depth of an object in a picture and obtain stereo perception.

SUMMARY

Embodiments of the present disclosure provide a 3D display device and a driving method thereof.

According to at least one embodiment of the present disclosure, a driving method of a 3D display device including: controlling first subpixels, arranged in an electroluminescent display (ELD) panel provided below a liquid crystal display (LCD) panel, to form luminous areas and black areas alternately arranged in a row direction; determining position information of eyes of a viewer on a display surface of the LCD panel; determining a position for displaying a left-eye view and a position for displaying a right-eye view, corresponding to each luminous area in the LCD panel according to an optical path from the eyes of the viewer to the luminous area of the ELD panel; and in 3D display mode, controlling second subpixels corresponding to the same position for displaying the left-eye image in the LCD panel to display same first gray scale information, and controlling second subpixels corresponding to the same position for displaying the right-eye view to display same second gray scale information, and the first gray scale information and the second gray scale information corresponding to the same luminous area for displaying a 3D view are different.

In a possible implementation, the driving method further including: acquiring a coordinate position of the left eye or the right eye of the viewer in a horizontal plane parallel to the LCD panel in real time if the viewer is determined to be within the predetermined viewing distance range on front of the LCD panel; determining a horizontal movement distance and a horizontal movement direction of the acquired coordinate position of the left eye or the right eye of the viewer in the horizontal plane; and determining the eye of the viewer has been moved if the horizontal movement distance of the coordinate position of the left eye or the right eye of the viewer in the horizontal plane parallel to the LCD panel is determined to be greater than the default value, and determining the horizontal movement distance and the horizontal movement direction of the coordinate position of the left eye or the right eye of the viewer in the horizontal plane as the position information of the eye of the viewer on the display surface of the LCD panel.

In a possible implementation, the driving method further including: re-determining the position for displaying the left-eye view and the position for displaying the right-eye view, corresponding to each luminous area, in the LCD panel according to the horizontal movement distance and the horizontal movement direction of the coordinate position of the left eye or the right eye of the viewer in the horizontal plane when the movement of the eye of the viewer is determined.

In a possible implementation, the driving method further including: translating a default distance along the horizontal movement direction between the position for displaying the left-eye view and the position for displaying the right-eye view corresponding to the luminous area after the movement of the eye of the viewer with respect to the position for displaying the left-eye view and the position for displaying the right-eye view corresponding to the luminous area before the movement of the eye of the viewer.

In a possible implementation, the driving method further including: determining the translation distance y of the position for displaying the left-eye view and the position for displaying the right-eye view, corresponding to the luminous area, according to the following formula: $y=p*x/L$, where p refers to a width of an area for displaying the left-eye view or the right-eye view; x refers to the horizontal movement distance of the coordinate position of the left eye or the right eye of the viewer in the horizontal plane; and L refers to an interpupillary distance between the left eye and the right eye of the viewer.

In a possible implementation, the driving method further including: controlling the first subpixels arranged in the ELD panel to form luminous areas and black areas alternately arranged in a column direction, while controlling the first subpixels arranged in the ELD panel to form luminous areas and black areas alternately arranged in the row direction.

In a possible implementation, in the ELD panel, adjacent columns of first subpixels have different luminous colors, and the same column of first subpixels have same luminous color. The driving method further includes controlling the same row of first subpixels in the ELD panel to be switched on alternately and the same column of first subpixels to be switched on alternately so as to form the luminous areas and the black areas which are alternately arranged.

In a possible implementation, the 3D display device further includes 2D display mode. In the 2D display mode, controlling the second subpixels corresponding to the position for displaying the left-eye view and the second subpixels corresponding to the position for displaying the right-eye view, in the same luminous area, to display same gray scale information.

Embodiments of the present disclosure also provide a 3D display device. The 3D display device includes a liquid crystal display (LCD) panel, an electroluminescent display (ELD) panel provided below the LCD panel, a visual tracking device and a processing device. The ELD panel includes a plurality of first subpixels arranged to form luminous areas and black areas which are alternately arranged in a row direction; the visual tracking device is configured to determine position information of eyes of a viewer on a display surface of the LCD panel; the processing device is configured to determine a position for displaying a left-eye view and a position for displaying a right-eye view, corresponding to each luminous area, in the LCD panel, according to an optical path from the eye of the viewer to the luminous area in the ELD panel. The LCD panel includes a plurality of second subpixels arranged in an array; and in the 3D display mode, the second subpixels corresponding to the same position for displaying the left-eye view display same first gray scale information, and the second subpixels corresponding to the same position for displaying the right-eye view display same second gray scale information. The first gray scale information and the second gray scale information corresponding to the same luminous area are different.

In a possible implementation, in the ELD panel, adjacent columns of first subpixels have different luminous colors, and the same column of first subpixels have same luminous color; and the second subpixels in the LCD panel are not provided with color filters (CFs).

In a possible implementation, a resolution of the LCD panel is higher than that of the ELD panel.

In a possible implementation, the luminous areas and the black areas formed by the first subpixels are also alternately arranged in the column direction.

In a possible implementation, in the 2D display mode, the second subpixels corresponding to the position for displaying the left-eye view and the second subpixels corresponding to the position for displaying the right-eye view, in the same luminous area, display same gray scale information.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which:

FIG. 5 is a schematic diagram of visual tracking in the driving method of the 3D display device provided by an embodiment of the present disclosure;

FIG. 6 is a schematic structural view of a 3D display device provided by an embodiment of the present disclosure;

FIG. 7 is a schematic diagram illustrating an arrangement of first subpixels in an ELD panel of an 3D display device provided by an embodiment of the present disclosure.

DETAILED DESCRIPTION

Technical solutions of the embodiments will be described in a clearly and understandable way connected with the drawings related to the embodiments of the disclosure. It is apparent that the described embodiments are just a part but not all of the embodiments of the disclosure. Based on the described embodiments herein, those skilled in the art can obtain other embodiment(s), without any inventive work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and if the position of the object which is described is changed, the relative position relationship may be changed accordingly.

The early 3D display device requires a user to wear corresponding 3D glasses, and in recent years, glasses-free 3D display devices receive much concern. Devices for achieving glasses-free 3D display normally have two types: parallax barrier 3D display device and lenticular lens 3D display device. The parallax barrier type is normally achieved via a switching LCD, a polymer liquid crystal layer and a polarizing sheet. The voltage difference between electrodes on an upper substrate and a lower substrate in the switching LCD is controlled so that liquid crystal molecules in the polymer liquid crystal layer can rotate to form opaque fringes, namely parallax barriers. When the switching LCD is switched on, under the action of the parallax barriers, an image capable of being viewed by the left eye can only be viewed by the left eye and the right eye is blocked; and an image capable of being viewed by the right eye can only be viewed by the right eye and the left eye is blocked. When the switching LCD is switched off, the display panel is not provided with the parallax barriers and becomes a common 2D display.

Figure 1:
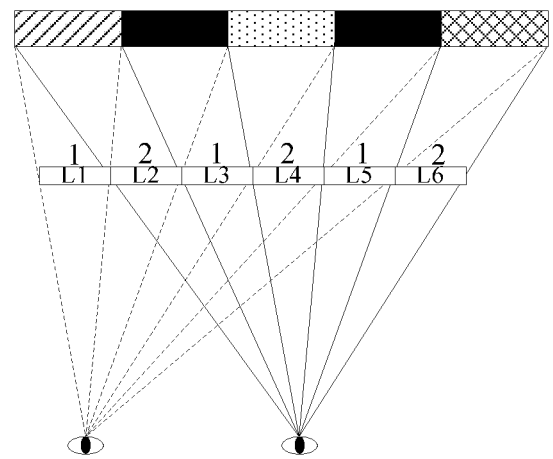
FIG. 1 is a schematic diagram illustrating the principle of 3D display of a rear grating.

In the 3D display mode, a rear grating as shown in FIG. 1 includes luminous areas and black areas; pixels corresponding to the same luminous area in a front panel display different gray scale information; two adjacent viewpoints receive images with different information; two different images are received when the eyes are respectively disposed at the two viewpoints; and the images are integrated in the brain to form one image by the vision of the two eyes, and a stereoscopic vision can be produced to achieve glasses-free 3D display. FIG. 1 illustrates an instance of achieving two viewpoints by taking the case that one luminous area corresponds to two pixels as an example, in which "1" and "2" are used for distinguishing different views; the left eye can view a view 1 displayed by pixels L1, L3 and L5 via the rear grating; and the right eye can view a view 2 displayed by pixels L2, L4 and L6 via the rear grating.

Figure 2:
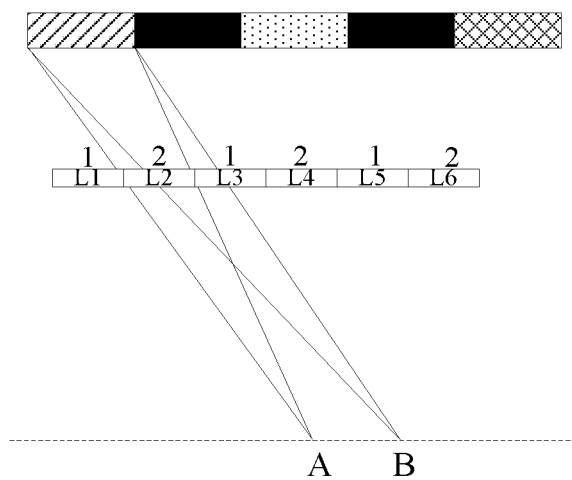
FIG. 2 is a schematic diagram illustrating the principle of producing crosstalk during the 3D display of the rear grating.

The inventors noticed that the 3D display device has problems of small continuous viewing angle and high crosstalk. For instance, as illustrated in FIG. 2, when the right eye of the viewer is disposed at a position A, the right eye can only view the view 2 through the pixel L2 of the LCD panel and cannot view the view 1. The position is defined to be an optimum viewing position. As the views displayed by the pixels of the LCD panel are unchanged, when the right eye of the viewer moves from the position A to a position B, the right eye not only can view the view 2 through the pixel L2 of the LCD panel but also can view the view 1 through the pixel L3 of the LCD panel. At this point, crosstalk is produced by the view 1 entering the right eye.

Figure 3:
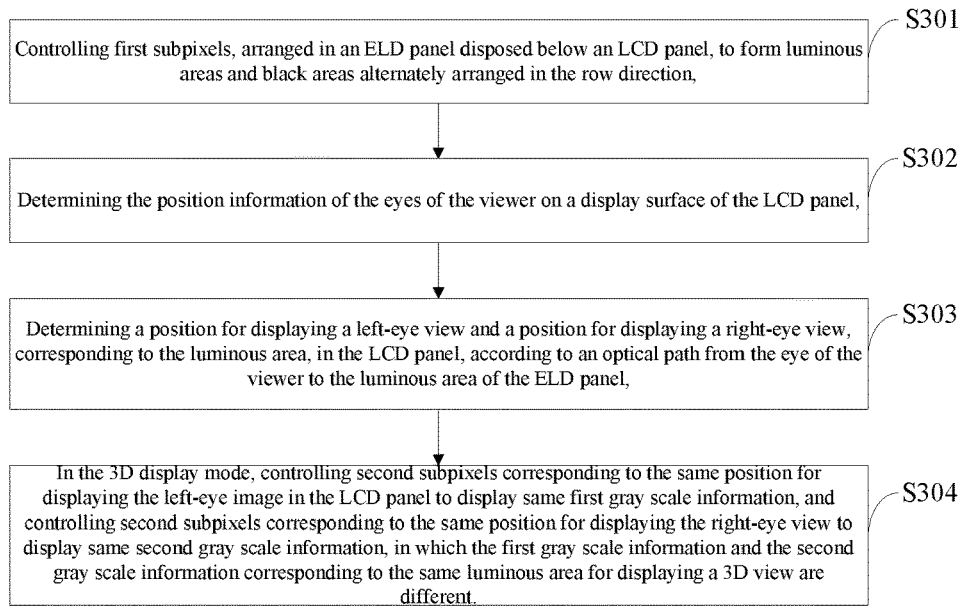
FIG. 3 is a flowchart of a driving method of a 3D display device provided by an embodiment of the present disclosure.

An embodiment of the present disclosure provides a driving method of a 3D display device, which, as illustrated in FIG. 3, includes the following steps.

S301: controlling first subpixels, arranged in an electroluminescent display (ELD) panel disposed below an LCD panel, to form luminous areas and black areas alternately arranged in the row direction.

S302: determining the position information of the eyes of the viewer on a display surface of the LCD panel.

S303: determining a position for displaying a left-eye view and a position for displaying a right-eye view, corresponding to the luminous area, in the liquid crystal display (LCD) panel, according to an optical path from the eye of the viewer to the luminous area of the ELD panel.

S304: in the 3D display mode, controlling second subpixels corresponding to the same position for displaying the left-eye view or image in the LCD panel to display same first gray scale information, and controlling second subpixels corresponding to the same position for displaying the right-eye view or image to display same second gray scale information, in which the first gray scale information and the second gray scale information corresponding to the same luminous area for displaying a 3D view are different.

The driving method provided by the embodiment of the present disclosure can determine the position for displaying the left-eye view and the position for displaying the right-eye image in the LCD panel according to the current position of the eye of the viewer, control the second subpixels corresponding to the same position for displaying the left-eye image in the LCD panel to display same view, and control the second subpixels corresponding to the same position for displaying the right-eye image to display same view. In this way, the display crosstalk caused by different views entering the same eye during the 3D display can be reduced. Moreover, the position for displaying the eye view in the LCD panel can change according to the current position of the eye of the viewer, so that the continuous viewing angle can be increased, and the effect of full-view 3D display can be achieved.

Figure 4:
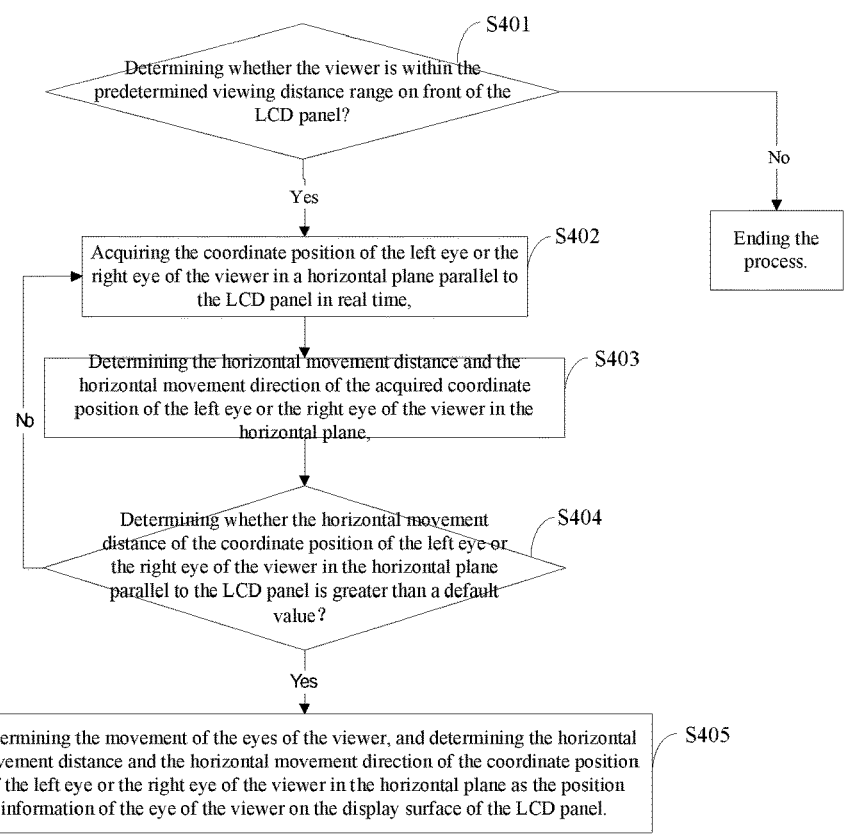
FIG. 4 is a flowchart illustrating the process of determining the position information of the eye of the viewer on a display surface of an LCD panel in the driving method of the 3D display device provided by an embodiment of the present disclosure.

For instance, the process of determining the position information of the eye of the viewer on the display surface of the LCD panel in the step S302 of the driving method provided by the embodiment of the present disclosure may, as shown in FIG. 4, adopt the following steps:

S401: determining whether the viewer is within the predetermined viewing distance range on front of the LCD panel, if yes, executing step S402, if no, ending the process.

For instance, the optimum viewing distance range for 3D display, e.g., 3-5 m, will be set for the 3D display device. The viewer can view the effect of 3D display within the range, and may not view the effect of 3D display if not within the range. The following function of visual tracking can only be executed when the viewer is within the viewing distance range capable of viewing the effect of 3D display.

S402: acquiring the coordinate position of the left eye or the right eye of the viewer in a horizontal plane parallel to the LCD panel in real time when the viewer is determined to be within the predetermined viewing distance range on front of the LCD panel.

For instance, the coordinate position of the left eye or the right eye of the viewer in the horizontal plane parallel to the LCD panel may be acquired via an image collecting device, such as a camera. For instance, a 2D coordinate system may be established by taking a specific point in the horizontal plane as an origin, so that the coordinate position can be determined.

S403: determining the horizontal movement distance and the horizontal movement direction of the acquired coordinate position of the left eye or the right eye of the viewer in the horizontal plane.

S404: determining whether the horizontal movement distance of the coordinate position of the left eye or the right eye of the viewer in the horizontal plane parallel to the LCD panel is greater than a default value, or not? If yes, executing S405; if No, returning to S402. If the horizontal movement distance is less than the default value, the movement of vision may be construed as too small, so 3D display crosstalk will not be produced.

S405: determining the movement of the eye of the viewer when the horizontal movement distance of the coordinate position of the left eye or the right eye of the viewer in the horizontal plane parallel to the LCD panel is determined to be greater than the default value, and determining the horizontal movement distance and the horizontal movement direction of the coordinate position of the left eye or the right eye of the viewer in the horizontal plane as the position information of the eye of the viewer on the display surface of the LCD panel.

For instance, the process of determining the position for displaying the left-eye view and the position for displaying the right-eye view, corresponding to the luminous area, in the LCD panel according to the optical path from the eye of the viewer to the luminous area in the ELD panel in the step S303 in the driving method provided by the embodiment of the present disclosure may include:

re-determining the position for displaying the left-eye view and the position for displaying the right-eye view, corresponding to the luminous area, in the LCD panel, according to the horizontal movement distance and the horizontal movement direction of the coordinate position of the left eye or the right eye of the viewer in the horizontal plane when the movement of the eye of the viewer is determined.

For instance, the process of re-determining the position for displaying the left-eye view and the position for displaying the right-eye view, corresponding to the luminous area, in the LCD, according to the horizontal movement distance and the horizontal movement direction of the coordinate position of the left eye or the right eye of the viewer in the horizontal plane may follow the rules below:

Between the position for displaying the left-eye view and the position for displaying the right-eye view corresponding to the luminous area after the movement of the eye of the viewer with respect to the position for displaying the left-eye view and the position for displaying the right-eye view corresponding to the luminous area before the movement of the eye of the viewer, the translation of default distance is performed along the horizontal movement direction of the left eye or the right eye of the viewer.

For instance, as illustrated in FIG. 5, when the human eye is disposed at a position A, a DF area in the LCD panel displays a view corresponding to the eye, and the gray scale information of the view displayed by all the second subpixels in the DF area of the LCD panel corresponding to the position A shall be same. When the human eye moves to a position B, an EG area in the LCD panel displays the view corresponding to the eye, and the gray scale information of the view displayed by all the second subpixels in the EG area of the LCD panel corresponding to the position B shall be same; and the gray scale information of the view displayed by the second subpixels in the DF area corresponding to the position A shall be same. Therefore, for the gray scale information of the view displayed by the second subpixels in the area to be same when the area for displaying the view corresponding to the eye in the LCD panel moves along with the movement of the position of the human eye, the area in the LCD panel shall include a plurality of second subpixels. For instance, the resolution of the LCD panel shall be higher than that of the ELD panel. Moreover, the higher the resolution of the LCD panel, the better, namely the number of the second subpixels in the LCD panel shall be greater than the number of the first subpixels in the ELD panel.

Based on the above discussion, as illustrated in FIG. 5, the width of the DF area in the horizontal direction is set to be p; the AB distance is x; the interpupillary distance between the left eye and the right eye of the viewer is L; the distance between the ELD panel and the LCD panel is h; and the viewing distance from the viewer to the LCD panel is s, the following formulas can be obtained: $p/L=h/(h+s)$; $DE/x=h/(h+s)$. The formula $DE=px/L$ can be derived from the above two formulas, in which DE refers to the movement distance of the display view.

In this way, in the driving method provided by the embodiment of the present disclosure, between the position for displaying the left-eye view and the position for displaying the right-eye view corresponding to the luminous area after the movement of the eye of the viewer with respect to the position for displaying the left-eye view and the position for displaying the right-eye view corresponding to the luminous area before the movement of the eye of the viewer, the translation of default distance is performed along the horizontal movement direction of the left eye or the right eye of the viewer, and the translation distance may be obtained by the following way: determining the translation distance y of the position for displaying the left-eye view and the position for displaying the right-eye view corresponding to the luminous area according to the following formula: $y=p*x/L$, where p refers to the width of the area for displaying the left-eye view or the right-eye view; x refers to the horizontal movement distance of the coordinate position of the left eye or the right eye of the viewer in the horizontal plane; and L refers to the interpupillary distance between the left eye and the right eye of the viewer.

For instance, the step S301 in the driving method provided by the embodiment of the present disclosure includes the process of controlling the first subpixels tightly arranged in the ELD panel to form the luminous areas and the black areas alternately arranged in the row direction, and it may also include controlling the first subpixels tightly arranged in the ELD panel to form luminous areas and black areas alternately arranged in the column direction. In this way, the luminous areas and the black areas in the ELD panel are uniformly distributed, so that the brightness of the formed backlight and grating can be uniformly distributed, and the phenomenon of irregular color can be reduced.

For instance, in the driving method provided by an embodiment of the present disclosure, the ELD panel may be adopted to achieve color display of the view (image), namely, as shown in FIG. 6, CFs in the LCD panel are removed. In this way, the light transmittance of the LCD panel in the 3D display device can be improved; the power consumption can be reduced; the display brightness can be improved; and the compatible display of landscape and portrait can be achieved. For instance, as illustrated in FIG. 7, the first subpixels tightly arranged in the ELD panel are set as follows: adjacent columns of first subpixels have different luminous colors, and the same column of first subpixels have same luminous color.

In the driving method provided by the embodiment of the present disclosure, the step of controlling the first subpixels tightly arranged in the ELD panel to form the luminous areas and the black areas alternately arranged along both the row direction and the column direction may adopt the following way.

Figure 8:
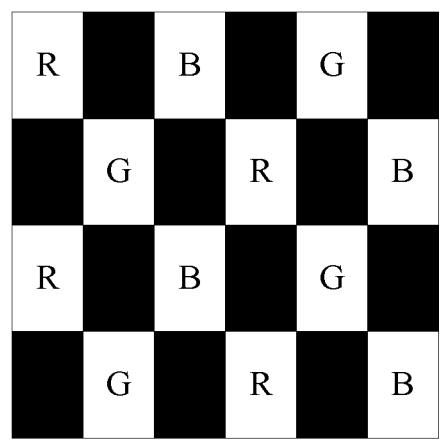
FIG. 8 is a schematic diagram displayed by first subpixels in an ELD panel of a 3D display device provided by an embodiment of the present disclosure, in the process of driving.

As shown in FIG. 8, controlling the same row of first subpixels in the ELD panel to be switched on alternately and the same column of first subpixels to be switched on alternately so as to form the luminous areas and the black areas which are alternately arranged. In this way, the first subpixels with different luminous colors at three positions of an upside-down T shaped are formed in the ELD panel, so that the brightness of the formed backlight and grating can be uniformly distributed, and the phenomenon of irregular color can be reduced. Moreover, the compatible display of landscape and portrait of the 3D display device can be achieved.

The driving method of the 3D display device provided by the embodiments of the present disclosure can also achieve the 2D display mode of the 3D display device. For instance, the driving method may further include the following step.

In the 2D display mode, controlling the second subpixels corresponding to the position for displaying the left-eye view or image and the second subpixels corresponding to the position for displaying the right-eye view or image, in the same luminous area, to display same gray scale information, so that the human eye can view two views or images which are same, and 2D display can be achieved.

With the same concept, an embodiment of the present disclosure also provides a 3D display device. The display device may be any product or component with display function, such as a mobile phone, a tablet PC, a TV, a display, a notebook computer, a digital picture frame and a navigator. As the principle of solving problems of the device is similar to that of the foregoing driving method, the embodiments of the device may refer to the embodiments of the driving method, no description to the repeated details will be given herein.

The embodiment of the present disclosure provides a 3D display device, as shown in FIG. 6, which includes: an LCD panel 100, an ELD panel 200 disposed below the LCD panel 100, a visual tracking device (not shown in FIG. 6) and a processing device (not shown in FIG. 6). As shown in FIG. 7, the ELD panel 200 includes a plurality of first subpixels which are sequentially arranged. As shown in FIG. 8, the first subpixels form luminous areas and black areas alternately arranged along the row direction.

The visual tracking device is configured to determine the position information of the eye of the viewer on a display surface of the LCD panel 100.

The processing device is configured to determine a position for displaying a left-eye view and a position for displaying a right-eye view, corresponding to the luminous area, in the LCD panel 100, according to an optical path from the eye of the viewer to each luminous area in the ELD panel 200.

The LCD panel 100 includes a plurality of second subpixels arranged in an array. In the 3D display mode, the second subpixels corresponding to the same position for displaying the left-eye view display same first gray scale information, and the second subpixels corresponding to the same position for displaying the right-eye view display same second gray scale information. Moreover, the first gray scale information and the second gray scale information corresponding to the same luminous area for displaying a 3D view are different.

For instance, when the 3D display device provided by the embodiment of the present disclosure displays a 2D image, namely in the 2D display mode, the second subpixels corresponding to the position for displaying the left-eye view and the second subpixels corresponding to the position for displaying the right-eye view, in the same luminous area, display same gray scale information, namely the human eye can view two views or images which are same, so that 2D display can be achieved.

For instance, in the 3D display device provided by the embodiment of the present disclosure, as illustrated in FIG. 8, the luminous areas and the black areas formed by the first subpixels are also alternately arranged in the column direction. At this point, the luminous areas and the black areas in the ELD panel are uniformly distributed, so that the brightness of the formed backlight and grating can be uniformly distributed, and the phenomenon of irregular color can be reduced.

For instance, in the 3D display device provided by the embodiment of the present disclosure, in the ELD panel 200, adjacent columns of first subpixels have different luminous colors and the same column of first subpixels have same luminous color, and the second subpixels in the LCD panel 100 are not provided with CFs. In this way, the light transmittance of the LCD panel 100 in the 3D display device can be improved; the power consumption can be reduced; the display brightness can be improved; and the compatible display of landscape and portrait can be achieved.

For instance, in the 3D display device provided by an embodiment of the present disclosure, the resolution of the LCD panel is higher than that of the ELD panel, and the higher the resolution of the LCD panel is, the better. In this way, for the gray scale information of the view displayed by the second subpixels in the area to be same when the area for displaying the view corresponding to the eye in the LCD panel moves along with the movement of the position of the human eye, the area in the LCD panel shall include a plurality of the second subpixels.

The 3D display device and the driving method provided by the embodiments of the present disclosure include: controlling the first subpixels, tightly arranged in the ELD panel disposed below the LCD panel, to form the luminous areas and the black areas alternately arranged in the row direction, so as to form a rear grating; determining the position information of the eye of the viewer on the display surface of the LCD panel; and determining the position for displaying the left-eye view and the position for displaying the right-eye view, corresponding to each luminous area, in the LCD panel, according to the optical path from the eye of the viewer to the luminous area in the ELD panel. In the 3D display mode, the second subpixels corresponding to the same position for displaying the left-eye view in the LCD panel are controlled to display same first gray scale information; the second subpixels corresponding to the same position for displaying the right-eye view in the LCD panel are controlled to display same second gray scale information; and the first gray scale information and the second gray scale information corresponding to the same luminous area for displaying the 3D view are different. The position for displaying the left-eye view and the position for displaying the right-eye view in the LCD panel are determined according to the current position of the eye of the viewer; the second subpixels corresponding to the same position for displaying the left-eye view in the LCD panel are controlled to display same view; and the second subpixels corresponding to the same position for displaying the right-eye view in the LCD panel are controlled to display same view. In this way, the display crosstalk caused by different views entering the same eye in the case of 3D display can be reduced.

Moreover, the position for displaying the eye view in the LCD panel can change according to the current position of the eye of the viewer, so that the continuous viewing angle can be increased, and the effect of full-view 3D display can be achieved.

The foregoing is only the exemplary embodiments of the present disclosure and not intended to limit the scope of the present disclosure. All the changes or alternations which may be readily contemplated by an ordinary skill in the art within the technical scope disclosed by the embodiments of the present disclosure shall fall within the scope of the present disclosure.

The present application claims priority to the Chinese patent application No. 201610007051.6 filed Jan. 5, 2016 and entitled "3D Display Device and Driving Method thereof", which is incorporated herein by reference in its entirety.

What is claimed is:

1. A driving method of a 3D display device, comprising:
controlling first subpixels, arranged in an electroluminescent display (ELD) panel provided below a liquid crystal display (LCD) panel, to form luminous areas and black areas alternately arranged in a row direction;
determining position information of eyes of a viewer on a display surface of the LCD panel;
determining a position for displaying a left-eye view and a position for displaying a right-eye view, corresponding to each luminous area in the LCD panel, according to an optical path from the eyes of the viewer to a luminous area of the ELD panel;
in a 3D display mode, controlling second subpixels corresponding to the same position for displaying the left-eye view in the LCD panel to display same first gray scale information, and controlling second subpixels corresponding to the same position for displaying the right-eye view to display same second gray scale information, in which the first gray scale information and the second gray scale information corresponding to the same luminous area for displaying a 3D view are different;
acquiring a coordinate position of a left eye or a right eye of the viewer in a horizontal plane parallel to the LCD panel in real time if the viewer is determined to be within a predetermined viewing distance range in front of the LCD panel;
determining a horizontal movement distance and a horizontal movement direction of the acquired coordinate position of the left eye or the right eye of the viewer in the horizontal plane; and
determining that an eye of the viewer has been moved if the horizontal movement distance of the coordinate position of the left eye or the right eye of the viewer in the horizontal plane parallel to the LCD panel is determined to be greater than a default value, and determining the horizontal movement distance and the horizontal movement direction of the coordinate position of the left eye or the right eye of the viewer in the horizontal plane as the position information of the eye of the viewer on the display surface of the LCD panel; and
determining a translation distance y of a position for displaying the left-eye view and a position for displaying the right-eye view, corresponding to the luminous area, according to the following formula: y=p*x/L,
where p refers to a width of an area for displaying the left-eye view or the right eye view; x refers to a horizontal movement distance of the coordinate position of the left eye or the right eye of the viewer in the horizontal plane; and L refers to an interpupillary distance between the left eye and the right eye of the viewer.

2. The driving method according to claim 1, further comprising:
re-determining the position for displaying the left-eye view and the position for displaying the right-eye view, corresponding to each luminous area, in the LCD panel according to the horizontal movement distance and the horizontal movement direction of the coordinate position of the left eye or the right eye of the viewer in the horizontal plane when a movement of the eye of the viewer is determined.

3. The driving method according to claim 2, further comprising:
translating a default distance along the horizontal movement direction between the position for displaying the left-eye view and the position for displaying the right-eye view corresponding to the luminous area after the movement of the eye of the viewer with respect to the position for displaying the left-eye view and the position for displaying the right-eye view corresponding to the luminous area before the movement of the eye of the viewer.

4. The driving method according to claim 1, further comprising: controlling the first subpixels arranged in the ELD panel to form luminous areas and black areas alternately arranged in a column direction.

5. The driving method according to claim 4, wherein in the ELD panel, adjacent columns of first subpixels have different luminous colors, and the same column of first subpixels have a same luminous color; and
the driving method further comprises:
controlling the same row of first subpixels in the ELD panel to be switched on alternately and the same column of first subpixels to be switched on alternately so as to form the luminous areas and the black areas which are alternately arranged.

6. The driving method according to claim 1, wherein the 3D display device further includes a 2D display mode:
in the 2D display mode, controlling the second subpixels corresponding to the position for displaying the left-eye view and the second subpixels corresponding to the position for displaying the right-eye view, in the same luminous area, to display same gray scale information.

7. A 3D display device, comprising: a liquid crystal display (LCD) panel, an electroluminescent display (ELD) panel provided below the LCD panel, a visual tracking device, and a processing device, wherein
the ELD panel includes a plurality of first subpixels arranged to form luminous areas and black areas which are alternately arranged in a row direction;
the visual tracking device is configured to determine position information of eyes of a viewer on a display surface of the LCD panel;
the processing device is configured to determine a position for displaying a left-eye view and a position for displaying a right-eye view, corresponding to each luminous area, in the LCD panel, according to an optical path from an eye of the viewer to a luminous area in the ELD panel;
the LCD panel includes a plurality of second subpixels arranged in an array; and in a 3D display mode, the second subpixels corresponding to the same position for displaying the left-eye view display same first gray scale information, and the second subpixels corresponding to the same position for displaying the right-eye view display same second gray scale information, wherein the first gray scale information and the second gray scale information corresponding to the same luminous area are different;
wherein a translation distance y of a position for displaying the left-eye view and a position for displaying the right-eye view, corresponding to the luminous area, is obtained according to the following formula: $y=p*x/L$,
where p refers to a width of an area for displaying the left-eye view or the right-eye view; x refers to a horizontal movement distance of a coordinate position of a left eye or a right eye of the viewer in a horizontal plane; and L refers to an interpupillary distance between the left eye and the right eye of the viewer.

8. The 3D display device according to claim 7, wherein in the ELD panel, adjacent columns of first subpixels have different luminous colors, and the same column of first subpixels have a same luminous color; and the second subpixels in the LCD panel are not provided with color filters (CFs).

9. The 3D display device according to claim 8, wherein a resolution of the LCD panel is higher than a resolution of the ELD panel.

10. The 3D display device according to claim 7, wherein the luminous areas and the black areas formed by the first subpixels are also alternately arranged in a column direction.

11. The 3D display device according to claim 7, wherein in a 2D display mode, the second subpixels corresponding to the position for displaying the left-eye view and the second subpixels corresponding to the position for displaying the right-eye view, in the same luminous area, display same gray scale information.

12. The 3D display device according to claim 7, wherein a resolution of the LCD panel is higher than a resolution of the ELD panel.

13. The 3D display device according to claim 12, wherein the luminous areas and the black areas formed by the first subpixels are also alternately arranged in a column direction.

14. The 3D display device according to claim 13, wherein in a 2D display mode, the second subpixels corresponding to the position for displaying the left-eye view and the second subpixels corresponding to the position for displaying the right-eye view, in the same luminous area, display same gray scale information.

* * * * *